United States Patent
Maeda

(10) Patent No.: US 10,749,153 B2
(45) Date of Patent: Aug. 18, 2020

(54) SEALANT FOR ELECTROCHEMICAL DEVICE IN WHICH NON-AQUEOUS ELECTROLYSIS SOLUTION IS USED AND SEALANT COMPOSITION FOR ELECTROCHEMICAL DEVICE

(71) Applicant: ZEON CORPORATION, Chiyoda-ku, Tokyo (JP)

(72) Inventor: Kouichirou Maeda, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 264 days.

(21) Appl. No.: 16/065,868

(22) PCT Filed: Jan. 6, 2017

(86) PCT No.: PCT/JP2017/000269
§ 371 (c)(1),
(2) Date: Jun. 25, 2018

(87) PCT Pub. No.: WO2017/119485
PCT Pub. Date: Jul. 13, 2017

(65) Prior Publication Data
US 2019/0013498 A1 Jan. 10, 2019

(30) Foreign Application Priority Data
Jan. 8, 2016 (JP) ................. 2016-002346

(51) Int. Cl.
| H01M 2/08 | (2006.01) |
| C08L 47/00 | (2006.01) |
| C08L 53/02 | (2006.01) |
| H01G 11/80 | (2013.01) |
| H01M 10/052 | (2010.01) |
| C09K 3/10 | (2006.01) |
| C08K 3/00 | (2018.01) |
| C08L 25/18 | (2006.01) |
| C08L 67/00 | (2006.01) |
| H01M 10/0525 | (2010.01) |
| H01M 10/0566 | (2010.01) |

(52) U.S. Cl.
CPC ............... *H01M 2/08* (2013.01); *C08K 3/00* (2013.01); *C08L 25/18* (2013.01); *C08L 47/00* (2013.01); *C08L 53/02* (2013.01); *C08L 67/00* (2013.01); *C09K 3/10* (2013.01); *H01G 11/80* (2013.01); *H01M 10/052* (2013.01); *H01M 10/0525* (2013.01); *C08L 2205/025* (2013.01); *C08L 2205/03* (2013.01); *C08L 2207/04* (2013.01); *H01M 10/0566* (2013.01); *Y02E 60/122* (2013.01); *Y02E 60/13* (2013.01); *Y02T 10/7011* (2013.01)

(58) Field of Classification Search
None
See application file for complete search history.

(56) References Cited

U.S. PATENT DOCUMENTS 5,874,512 A * 2/1999 Farley ................ C08F 210/00
526/308
6,653,408 B1 * 11/2003 St. Clair ................. C08F 8/42
525/327.8

FOREIGN PATENT DOCUMENTS

JP 3574276 B2 10/2004

OTHER PUBLICATIONS

May 13, 2019, The Extended European Search Report issued by the European Patent Office in the corresponding European Patent Application No. 17736022.9.

Jul. 10, 2018, International Preliminary Report on Patentability issued in the International Patent Application No. PCT/JP2017/000269.

* cited by examiner

*Primary Examiner* — Wyatt P McConnell
(74) *Attorney, Agent, or Firm* — Kenja IP Law PC

(57) ABSTRACT

Provided is a sealant for an electrochemical device in which a non-aqueous electrolysis solution is used that has sufficient sealing performance even with respect to a high-polarity resin. The sealant contains a conjugated diene polymer (A), an aromatic vinyl-conjugated diene block polymer (B), and a hydrogenated amine-modified aromatic vinyl-conjugated diene block polymer (C).

6 Claims, No Drawings

SEALANT FOR ELECTROCHEMICAL DEVICE IN WHICH NON-AQUEOUS ELECTROLYSIS SOLUTION IS USED AND SEALANT COMPOSITION FOR ELECTROCHEMICAL DEVICE

TECHNICAL FIELD

This disclosure relates to a sealant for an electrochemical device that can be used in an electrochemical device in which a non-aqueous electrolysis solution is used, such as a lithium ion battery, and also relates to a sealant composition for an electrochemical device in which the sealant is used.

BACKGROUND

Examples of electrochemical devices in which organic solvent-containing electrolysis solutions (non-aqueous electrolysis solutions) are used include electric double-layer capacitors and lithium ion batteries. In such electrochemical devices, it is necessary to prevent evaporation and leakage of sealed-in electrolysis solution and also to prevent infiltration of water and water vapor from outside of the electrochemical device. For this reason, sealants are widely used in electrochemical devices.

Vinyl aromatic hydrocarbon-conjugated diene block polymers, hydrogenated products thereof, conjugated diene polymers, and so forth have been proposed as sealants (for example, refer to PTL 1). These sealants are suitable in a situation in which a gasket for battery sealing is formed from a polyolefin such as polypropylene that is a non-polar resin.

In recent years, applications for electrochemical devices have expanded to electric vehicles and the like, resulting in demand for durability at even higher temperatures. Consequently, thermoplastic polyester elastomers (TPCs), which are resins having high mechanical strength at high temperature and good flexibility at low temperature, are being used as materials of gaskets for battery sealing. Since TPCs are resins that have high polarity compared to polypropylene and the like, there are cases in which sufficient wettability and adequate close adherence cannot be obtained using sealants that do not include polar groups. In other words, when a sealant that does not include a polar group, such as a sealant designed for gaskets made from polypropylene, is used with respect to a gasket made from a TPC, sealing performance may be insufficient.

CITATION LIST

Patent Literature

PTL 1: JP 3574276 B

SUMMARY

Technical Problem

An objective of this disclosure is to provide a sealant for an electrochemical device in which a non-aqueous electrolysis solution is used that has sufficient sealing performance even with respect to a high-polarity resin, and a sealant composition for an electrochemical device in which this sealant is used.

Solution to Problem

The inventor conducted a diligent investigation aimed at solving the problems set forth above. Through this investigation, the inventor discovered that the problems set forth above can be solved through use of polymer components including a conjugated diene polymer, an aromatic vinyl-conjugated diene block polymer, and a hydrogenated amine-modified aromatic vinyl-conjugated diene block polymer, and thereby completed this disclosure.

Specifically, this disclosure provides the following.

(1) A sealant for an electrochemical device in which a non-aqueous electrolysis solution is used, comprising: a conjugated diene polymer (A); an aromatic vinyl-conjugated diene block polymer (B); and a hydrogenated amine-modified aromatic vinyl-conjugated diene block polymer (C).

(2) The sealant for an electrochemical device in which a non-aqueous electrolysis solution is used according to (1), wherein at least 37 mass % and not more than 80 mass % of the conjugated diene polymer (A), at least 3 mass % and not more than 30 mass % of the aromatic vinyl-conjugated diene block polymer (B), and at least 10 mass % and not more than 60 mass % of the hydrogenated amine-modified aromatic vinyl-conjugated diene block polymer (C) are contained relative to a total amount of the conjugated diene polymer (A), the aromatic vinyl-conjugated diene block polymer (B), and the hydrogenated amine-modified aromatic vinyl-conjugated diene block polymer (C).

(3) The sealant for an electrochemical device in which a non-aqueous electrolysis solution is used according to (1) or (2), further comprising at least 0.1 parts by mass and not more than 10 parts by mass of an inorganic filler (D) per 100 parts by mass of solid content of polymer components including the conjugated diene polymer (A), the aromatic vinyl-conjugated diene block polymer (B), and the hydrogenated amine-modified aromatic vinyl-conjugated diene block polymer (C).

(4) A sealant composition for an electrochemical device comprising the sealant for an electrochemical device in which a non-aqueous electrolysis solution is used according to any one of (1) to (3) dissolved in an organic solvent such as to have a solid content concentration of at least 1 mass % and not more than 20 mass %.

(5) An electrochemical device comprising: a container having an opening and housing an electrical power generating element; and an insulating gasket installed at the opening of the container through a sealant or an insulating gasket attached through a sealant to a sealing body that is installed at the opening of the container, wherein the sealant is the sealant for an electrochemical device in which a non-aqueous electrolysis solution is used according to any one of (1) to (3).

(6) The electrochemical device according to (5), wherein the insulating gasket is formed from a thermoplastic polyester elastomer.

Advantageous Effect

The presently disclosed sealant for an electrochemical device in which a non-aqueous electrolysis solution is used and sealant composition for an electrochemical device have sufficient sealing performance even with respect to a high-polarity resin.

DETAILED DESCRIPTION

The following describes a presently disclosed sealant for an electrochemical device in which a non-aqueous electrolysis solution is used. The presently disclosed sealant for an electrochemical device in which a non-aqueous electrolysis solution is used (hereinafter, also referred to as a "sealant")

contains a conjugated diene polymer (A), an aromatic vinyl-conjugated diene block polymer (B), and a hydrogenated amine-modified aromatic vinyl-conjugated diene block polymer (C).

<Conjugated Diene Polymer (A)>

The presently disclosed sealant contains a conjugated diene polymer (A). The conjugated diene polymer (A) is a polymer that is obtained through polymerization of a conjugated diene compound. Specific examples of conjugated diene compounds that may be used include 1,3-butadiene, isoprene, 2,3-dimethyl-1,3-butadiene, 1,3-pentadiene, 2-methyl-1,3-pentadiene, 1,3-hexadiene, and 4,5-dimethyl-1,3-octadiene. Of these conjugated diene compounds, 1,3-butadiene and isoprene are particularly preferable.

The conjugated diene polymer (A) may be a polymer obtained through polymerization of only a conjugated diene compound or may be a copolymer of a conjugated diene compound and a compound other than a conjugated diene compound that is copolymerizable with the conjugated diene compound (note that copolymers equivalent to an aromatic vinyl-conjugated diene block polymer (B) or a hydrogenated amine-modified aromatic vinyl-conjugated diene block polymer (C) are excluded). Of such polymers and copolymers, a polymer obtained through polymerization of only a conjugated diene compound is preferable as the conjugated diene polymer (A).

Conjugated diene compounds such as described above may be used individually or as a combination of two or more types in polymerization of the conjugated diene polymer (A). Moreover, the molecular weight of the conjugated diene polymer (A) in terms of weight average molecular weight (Mw) is preferably at least 100,000 and not more than 1,000,000.

No specific limitations are placed on the method by which the conjugated diene polymer (A) is produced. The method of polymerization may, for example, be emulsion polymerization or solution polymerization. Moreover, radical polymerization, anionic polymerization, or the like may be adopted as the polymerization reaction. Of these methods, solution polymerization using radical polymerization is preferable.

The polymerization is carried out in the presence of a polymerization initiator within a temperature range of normally at least 0° C. and not higher than 150° C., preferably at least 20° C. and not higher than 100° C., and particularly preferably at least 10° C. and not higher than 80° C.

<Aromatic Vinyl-Conjugated Diene Block Polymer (B)>

The presently disclosed sealant also contains an aromatic vinyl-conjugated diene block polymer (B). Specific examples of aromatic vinyl compounds that may be used in production of the aromatic vinyl-conjugated diene block polymer (B) include styrene, α-methylstyrene, o-methyl styrene, m-methylstyrene, p-methyl styrene, t-butylstyrene, divinylbenzene, N,N-dimethyl-p-aminoethylstyrene, 2,4-dimethylstyrene, N,N-diethyl-p-aminoethylstyrene, 2,4-dimethylstyrene, vinylnaphthalene, and vinylanthracene. Of these aromatic vinyl compounds, styrene and α-methylstyrene are particularly preferable. These aromatic vinyl compounds may be used individually or as a combination of two or more types.

Specific examples of conjugated diene compounds that may be used in production of the aromatic vinyl-conjugated diene block polymer (B) include 1,3-butadiene, isoprene, 2,3-dimethyl-1,3-butadiene, 1,3-pentadiene, 2-methyl-1,3-pentadiene, 1,3-hexadiene, and 4,5-dimethyl-1,3-octadiene. Of these conjugated diene compounds, 1,3-butadiene and isoprene are particularly preferable. These conjugated diene compounds may be used individually or as a combination of two or more types.

The aromatic vinyl-conjugated diene block polymer (B) is preferably a block polymer that includes an aromatic vinyl polymer block (P) and a conjugated diene polymer block (Q) and has a block structure represented by $(P-Q)_nP$ or $(P-Q)_m$ (n is an integer of 1 or more, and preferably an integer of at least 1 and not more than 10; m is an integer of 1 or more, and preferably an integer of at least 2 and not more than 10).

Specific examples of aromatic vinyl-conjugated diene block polymers (B) such as described above include a styrene-isoprene block copolymer and a styrene-butadiene block copolymer. Moreover, it is preferable that a diblock copolymer, a triblock copolymer, or a mixture thereof is used as the aromatic vinyl-conjugated diene block polymer (B). Examples of triblock copolymers that may be used include a styrene-isoprene-styrene block copolymer (SIS) and a styrene-butadiene-styrene block copolymer (SBS). Of these examples, a styrene-isoprene block copolymer (diblock copolymer, triblock copolymer, or mixture thereof) is preferable.

No specific limitations are placed on the method by which the aromatic vinyl-conjugated diene block polymer (B) is produced and a method that uses radical polymerization, anionic polymerization, cationic polymerization, coordination anionic polymerization, coordination cationic polymerization, or the like may be adopted. Of these methods, a method in which radical polymerization, anionic polymerization, cationic polymerization or the like is carried out by living polymerization is preferable, and a method carried out by living anionic polymerization is particularly preferable.

The polymerization is carried out in the presence of a polymerization initiator within a temperature range of normally at least 0° C. and not higher than 150° C., preferably at least 20° C. and not higher than 100° C., and particularly preferably at least 10° C. and not higher than 80° C. Examples of polymerization initiators that may be used in the case of living anionic polymerization include monoorganolithium compounds such as n-butyllithium, sec-butyllithium, t-butyllithium, hexyllithium, and phenyllithium; and polyfunctional organolithium compounds such as dilithiomethane, 1,4-dilithiobutane, and 1,4-dilithio-2-ethylcyclohexane.

Although the form of polymerization reaction may be any of solution polymerization, slurry polymerization, and the like, the use of solution polymerization enables simple removal of reaction heat. In the case of solution polymerization, an inert solvent is used in which a polymer obtained through the block polymer production process dissolves. Examples of inert solvents that may be used include aliphatic hydrocarbons such as n-butane, n-pentane, isopentane, n-hexane, n-heptane, and isooctane; alicyclic hydrocarbons such as cyclopentane, cyclohexane, methylcyclopentane, methylcyclohexane, decalin, bicyclo[4.3.0]nonane, and tricyclo$[4.3.0.1^{2,5}]$decane; and aromatic hydrocarbons such as benzene and toluene. These solvents may be used individually or as a combination of two or more types. The amount of these solvents that is used per 100 parts by mass of all used monomers is normally at least 200 parts by mass and not more than 2,000 parts by mass.

In a case in which two or more monomers are used to obtain a block polymer, a randomizer or the like may be used to prevent chain lengthening of only one component. In particular, in a case in which the polymerization reaction is carried out by anionic polymerization, it is preferable to use a Lewis base compound or the like as a randomizer.

Examples of Lewis base compounds that may be used include ether compounds such as dimethyl ether, diethyl ether, diisopropyl ether, dibutyl ether, tetrahydrofuran, diphenyl ether, ethylene glycol diethyl ether, and ethylene glycol methyl phenyl ether; tertiary amine compounds such as tetramethylethylenediamine, trimethylamine, triethylamine, and pyridine; alkali metal alkoxide compounds such as potassium-t-amyloxide and potassium-t-butyloxide; and phosphine compounds such as triphenylphosphine. These Lewis base compounds may be used individually or as a combination of two or more types.

<Hydrogenated Amine-Modified Aromatic Vinyl-Conjugated Diene Block Polymer (C)>

The presently disclosed sealant also contains a hydrogenated amine-modified aromatic vinyl-conjugated diene block polymer (C). The hydrogenated amine-modified aromatic vinyl-conjugated diene block polymer (C) may be obtained by, for example, using a modifier to carry out an addition reaction with respect to a living terminal of a pre-amine-modification and pre-hydrogenation aromatic vinyl-conjugated diene block polymer (i.e., an aromatic vinyl-conjugated diene block polymer (B) such as described above or the like) to thereby obtain an amine-modified block polymer, and subsequently carrying out a hydrogenation reaction.

Specific examples of aromatic vinyl compounds that may be used in production of the hydrogenated amine-modified aromatic vinyl-conjugated diene block polymer (C) include the aromatic vinyl compounds given as specific examples of aromatic vinyl compounds that may be used in production of the aromatic vinyl-conjugated diene block polymer (B). Of these aromatic vinyl compounds, styrene and α-methylstyrene are particularly preferable. These aromatic vinyl compounds may be used individually or as a combination of two or more types.

Specific examples of conjugated diene compounds that may be used in production of the hydrogenated amine-modified aromatic vinyl-conjugated diene block polymer (C) include the conjugated diene compounds given as examples of conjugated diene compounds that may be used in production of the aromatic vinyl-conjugated diene block polymer (B). Of these conjugated diene compounds, 1,3-butadiene and isoprene are preferable, and 1,3-butadiene is particularly preferable. These conjugated diene compounds may be used individually or as a combination of two or more types.

The pre-amine-modification and pre-hydrogenation aromatic vinyl-conjugated diene block polymer of the hydrogenated amine-modified aromatic vinyl-conjugated diene block polymer (C) is preferably a block polymer that includes an aromatic vinyl polymer block (P) and a conjugated diene polymer block (Q) and has a block structure represented by $(P-Q)_nP$ or $(P-Q)_m$ (n is an integer of 1 or more, and preferably an integer of at least 1 and not more than 10; m is an integer of 1 or more, and preferably an integer of at least 2 and not more than 10).

No specific limitations are placed on the method by which the pre-amine-modification and pre-hydrogenation aromatic vinyl-conjugated diene block polymer of the hydrogenated amine-modified aromatic vinyl-conjugated diene block polymer (C) is produced and a method that uses radical polymerization, anionic polymerization, cationic polymerization, coordination anionic polymerization, coordination cationic polymerization, or the like may be adopted. Of these methods, a method in which radical polymerization, anionic polymerization, cationic polymerization, or the like is carried out by living polymerization, and particularly a method carried out by living anionic polymerization enables simple polymerization operation and simple hydrogenation reaction in a subsequent step.

The polymerization conditions and form of polymerization reaction of the pre-amine-modification and pre-hydrogenation aromatic vinyl-conjugated diene block polymer of the hydrogenated amine-modified aromatic vinyl-conjugated diene block polymer (C) are not specifically limited, and polymerization conditions and a form of polymerization reaction that are the same as those for the aromatic vinyl-conjugated diene block polymer (B) may be adopted.

<<Amine Modification Reaction>>

An amine modification reaction can be carried out by causing an addition reaction of an amine-containing modifier or a modifier in which an amine is protected by a commonly known method with respect to a living terminal of the block polymer obtained as described above. Through this reaction, an aromatic vinyl-conjugated diene block polymer having at least one bonded atom group including at least one amine (hereinafter, also referred to as a "precursor") can be obtained. Examples of amine-containing modifiers that may be used include tetraglycidyl-1,3-bisaminomethylcyclohexane and N,N-bis(trimethylsilyl)aminopropylmethyldiethoxysilane.

Moreover, the precursor may be obtained by reacting an organic alkali metal compound such as an organolithium compound with the block polymer (metalation reaction) and then causing an addition reaction of an amine-containing modifier with respect to the polymer obtained through organic alkali metal addition to the block polymer.

It should also be noted that the hydrogenated amine-modified aromatic vinyl-conjugated diene block polymer (C) can be obtained by carrying out a metalation reaction of a hydrogenated block polymer obtained through a hydrogenation reaction and then reacting an amine-containing modifier therewith.

<<Hydrogenation Reaction>>

The precursor obtained as described above is subsequently hydrogenated to obtain the hydrogenated amine-modified aromatic vinyl-conjugated diene block polymer (C). The hydrogenation may be carried out in the presence of a hydrogenation catalyst. Examples of hydrogenation catalysts that may be used include catalysts including one or more metals selected from nickel, cobalt, iron, titanium, rhodium, palladium, platinum, ruthenium, rhenium, and the like. It is preferable to use a catalyst that includes nickel since this can prevent polymer chain scission and enables hydrogenation under low temperature and low pressure. Both heterogeneous catalysts and homogeneous catalysts can be used as the hydrogenation catalyst. The hydrogenation reaction is preferably carried out in an organic solvent.

A heterogeneous catalyst may be used in the form of a metal or metal compound, or may be used mounted on an appropriate support. Examples of supports that may be used include activated carbon, silica, alumina, calcium carbonate, titania, magnesia, zirconia, diatomaceous earth, silicon carbide, and calcium fluoride. The supported amount of catalyst is normally at least 0.1 mass % and not more than 60 mass %, and preferably at least 1 mass % and not more than 50 mass %. The supported catalyst may, for example, have a specific surface area of at least 100 $m^2/g$ and not more than 500 $m^2/g$, and may have an average pore diameter of at least 100 angstroms and not more than 1,000 angstroms, and preferably at least 200 angstroms and not more than 500 angstroms. The value of the specific surface area is a value obtained through measurement of the amount of nitrogen adsorption and calculation by the BET method, and the value of the average pore diameter is a value measured by the mercury intrusion method.

Examples of homogeneous catalysts that may be used include catalysts that are a combination of a nickel, cobalt, titanium, or iron compound and an organometal compound (for example, an organoaluminum compound or an organolithium compound); and transition metal complex catalysts of rhodium, palladium, platinum, ruthenium, rhenium, iron, nickel, and the like. The nickel, cobalt, titanium, or iron compound may, for example, be an acetylacetonato compound, carboxylic acid salt, or cyclopentadienyl compound of any of these metals. Examples of organoaluminum compounds that may be used include alkyl aluminums such as triethylaluminum and triisobutylaluminum; halogenated aluminums such as diethylaluminum chloride and ethylaluminum dichloride; and hydrogenated alkyl aluminums such as diisobutylaluminum hydride. Examples of organolithium compounds that may be used include lithium borohydride.

Examples of transition metal complex catalysts that may be used include transition metal complexes such as dihydridotetrakis(triphenylphosphine)ruthenium, dihydridotetrakis(triphenylphosphine)iron, bis(cyclooctadiene)nickel, and bis(cyclopentadienyl)nickel.

These hydrogenation catalysts may be used individually or as a combination of two or more types. The amount of hydrogenation catalyst that is used per 100 parts by mass of polymer is normally at least 0.01 parts by mass and not more than 100 parts by mass, preferably at least 0.05 parts by mass and not more than 50 parts by mass, and more preferably at least 0.1 parts by mass and not more than 30 parts by mass.

The hydrogenation reaction temperature is normally at least 0° C. and not higher than 250° C., preferably at least 50° C. and not higher than 200° C., and more preferably at least 80° C. and not higher than 180° C. A temperature range such as set forth above increases percentage hydrogenation and reduces molecular scission. The hydrogen pressure, in terms of gauge pressure, is normally at least 0.1 MPa and not higher than 30 MPa, preferably at least 1 MPa and not higher than 20 MPa, and more preferably at least 2 MPa and not higher than 10 MPa since this increases percentage hydrogenation, reduces molecular scission, and provides excellent operability. The percentage hydrogenation of the hydrogenation reaction in terms of percentage hydrogenation of main chain and side chain carbon-carbon unsaturated bonds as measured by $^1$H-NMR is preferably 90% or more, more preferably 93% or more, and even more preferably 95% or more.

The percentage hydrogenation of main chain and side chain carbon-carbon unsaturated bonds in the hydrogenated block polymer can be calculated by measuring $^1$H-NMR spectra before and after the hydrogenation reaction and determining the reduction in the integrated value for a signal corresponding to carbon-carbon unsaturated bonds in main chain and side chain sections between before and after the hydrogenation reaction.

The hydrogenated amine-modified aromatic vinyl-conjugated diene block polymer (C) is obtained from a reaction solution containing the hydrogenated amine-modified aromatic vinyl-conjugated diene block polymer (C) after removing hydrogenation catalyst and/or polymerization catalyst from the reaction solution by a method such as filtration or centrifugal separation.

Although the above describes a configuration in which a hydrogenation reaction is carried out after an amine modification reaction, an amine modification reaction may alternatively be carried out after an aromatic vinyl-conjugated diene block polymer is subjected to a hydrogenation reaction.

Specific examples of the hydrogenated amine-modified aromatic vinyl-conjugated diene block polymer (C) include a hydrogenated product of an amine-modified styrene-butadiene-styrene block copolymer (SBS) (i.e., an amine-modified styrene-ethylene-butylene-styrene block copolymer (SEBS)) and a hydrogenated product of an amine-modified styrene-isoprene-styrene block copolymer (SIS) (i.e., an amine-modified styrene-ethylene-propylene-styrene block copolymer (SEPS)). Of these examples, an amine-modified styrene-ethylene-butylene-styrene block copolymer (SEBS) is preferable.

Hydrogenated amine-modified aromatic vinyl-conjugated diene block polymers (C) are commercially available and specific examples thereof include Tuftec® MP10 (Tuftec is a registered trademark in Japan, other countries, or both) produced by Asahi Kasei Chemicals Corporation and DYNARON® 8630P (DYNARON is a registered trademark in Japan, other countries, or both) produced by JSR Corporation.

(Sealant)

The presently disclosed sealant contains the conjugated diene polymer (A), the aromatic vinyl-conjugated diene block polymer (B), and the hydrogenated amine-modified aromatic vinyl-conjugated diene block polymer (C).

Also note that the sealant may further contain any polymer other than the conjugated diene polymer (A), the aromatic vinyl-conjugated diene block polymer (B), and the hydrogenated amine-modified aromatic vinyl-conjugated diene block polymer (C).

The amount of the conjugated diene polymer (A) relative to the total amount of the conjugated diene polymer (A), the aromatic vinyl-conjugated diene block polymer (B), and the hydrogenated amine-modified aromatic vinyl-conjugated diene block polymer (C) is preferably at least 37 mass % and not more than 80 mass %, more preferably at least 45 mass % and not more than 75 mass %, and even more preferably at least 48 mass % and not more than 70 mass %. By setting the amount of the conjugated diene polymer (A) as not more than the upper limit of any of the ranges set forth above, it is possible to inhibit a phenomenon in which there is excessive deterioration of high-temperature durability of an obtained sealant layer. Moreover, by setting the amount of the conjugated diene polymer (A) as at least the lower limit of any of the ranges set forth above, it is possible to inhibit a phenomenon in which there is excessive reduction of peel strength of an obtained sealant layer.

The amount of the aromatic vinyl-conjugated diene block polymer (B) relative to the total amount of the conjugated diene polymer (A), the aromatic vinyl-conjugated diene block polymer (B), and the hydrogenated amine-modified aromatic vinyl-conjugated diene block polymer (C) is preferably at least 3 mass % and not more than 30 mass %, more preferably at least 5 mass % and not more than 25 mass %, and even more preferably at least 7 mass % and not more than 20 mass %. By setting the amount of the aromatic vinyl-conjugated diene block polymer (B) as not more than the upper limit of any of the ranges set forth above, it is possible to inhibit a phenomenon in which there is excessive reduction of flexibility of an obtained sealant layer (i.e., excessive reduction of sealing ability). Moreover, by setting the amount of the aromatic vinyl-conjugated diene block polymer (B) as at least the lower limit of any of the ranges set forth above, it is possible to inhibit a phenomenon in which there is excessive reduction of close adherence of an obtained sealant layer with respect to an insulating gasket.

The amount of the hydrogenated amine-modified aromatic vinyl-conjugated diene block polymer (C) relative to the total amount of the conjugated diene polymer (A), the aromatic vinyl-conjugated diene block polymer (B), and the hydrogenated amine-modified aromatic vinyl-conjugated diene block polymer (C) is preferably at least 10 mass % and not more than 60 mass %, more preferably at least 15 mass % and not more than 50 mass %, and even more preferably at least 15 mass % and not more than 45 mass %. By setting the amount of the hydrogenated amine-modified aromatic vinyl-conjugated diene block polymer (C) as not more than the upper limit of any of the ranges set forth above, it is possible to inhibit a phenomenon in which there is excessive reduction of flexibility of an obtained sealant layer (i.e., excessive reduction of sealing ability). Moreover, by setting the amount of the hydrogenated amine-modified aromatic vinyl-conjugated diene block polymer (C) as at least the lower limit of any of the ranges set forth above, it is possible to inhibit a phenomenon in which there is excessive reduction of close adherence of an obtained sealant layer with respect to an insulating gasket.

Besides the conjugated diene polymer (A), the aromatic vinyl-conjugated diene block polymer (B), and the hydrogenated amine-modified aromatic vinyl-conjugated diene block polymer (C), the presently disclosed sealant preferably further contains an inorganic filler (D).

<Inorganic Filler (D)>

Carbon black, graphite, or the like may be used as the inorganic filler (D). Specific examples of carbon black that may be used include furnace black and channel black. Specific examples of graphite that may be used include natural flake graphite and artificial graphite. These inorganic fillers (D) may be used individually or as a combination of two or more types.

The amount of the inorganic filler (D) in the sealant is at least 0.1 parts by mass and not more than 10 parts by mass per 100 parts by mass of solid content of polymer components including the conjugated diene polymer (A), the aromatic vinyl-conjugated diene block polymer (B), and the hydrogenated amine-modified aromatic vinyl-conjugated diene block polymer (C) (hereinafter, also referred to as "polymer components"). By setting the amount of the inorganic filler (D) as not more than the upper limit of the range set forth above, it is possible to inhibit a phenomenon in which there is excessive reduction of electrical insulation. Moreover, by setting the amount of the inorganic filler (D) as at least the lower limit of the range set forth above, it is possible to avoid a phenomenon in which it becomes too difficult to visually recognize coating unevenness of an obtained sealant layer.

It should be noted that in a case in which the sealant further contains an optional polymer, the "polymer components" are the conjugated diene polymer (A), the aromatic vinyl-conjugated diene block polymer (B), the hydrogenated amine-modified aromatic vinyl-conjugated diene block polymer (C), and the optional polymer.

<Various Compounding Agents>

Besides the conjugated diene polymer (A), the aromatic vinyl-conjugated diene block polymer (B), the hydrogenated amine-modified aromatic vinyl-conjugated diene block polymer (C), and the inorganic filler (D) that is used as necessary, the presently disclosed sealant may contain various compounding agents such as stabilizers, dispersants, and ultraviolet absorbers that are normally used in the resin industrial field.

Specific examples of stabilizers that may be used include phenolic antioxidants, phosphoric antioxidants, and sulfuric antioxidants. Of these stabilizers, phenolic antioxidants are preferable, and alkyl-substituted phenolic antioxidants are particularly preferable. These stabilizers may be used individually or as a combination of two or more types. The amount of stabilizer in the sealant may be selected as appropriate depending on the objective of use and is normally at least 0.001 parts by mass and not more than 10 parts by mass per 100 parts by mass of the polymer components.

Examples of dispersants that may be used include anionic compounds, cationic compounds, non-ionic compounds, and polymeric compounds. Of these dispersants, non-ionic compounds are preferable, and among non-ionic compounds, non-ionic surfactants are preferable.

Examples of ultraviolet absorbers that may be used include organic substances such as benzotriazole ultraviolet absorbers, benzoate ultraviolet absorbers, benzophenone ultraviolet absorbers, acrylate ultraviolet absorbers, metal complex ultraviolet absorbers, and salicylic acid esters, and inorganic substances such as fine particulate zinc oxide, cerium oxide, and titanium oxide. The content ratio of ultraviolet absorber in the sealant is preferably at least 0.01 parts by mass and not more than 2 parts by mass per 100 parts by mass of the polymer components from a viewpoint of preventing degradation due to ultraviolet rays.

(Sealant Composition)

A presently disclosed sealant composition contains, dissolved in an organic solvent, a sealant containing a conjugated diene polymer (A), an aromatic vinyl-conjugated diene block polymer (B), a hydrogenated amine-modified aromatic vinyl-conjugated diene block polymer (C), an inorganic filler (D) and various compounding agents that are used as necessary, and so forth. In the sealant composition, the sealant is preferably dissolved in the organic solvent such as to have a solid content concentration of at least 1 mass % and not more than 20 mass %.

When the solid content concentration of the sealant in the organic solvent is not more than the upper limit of the range set forth above, it is possible to inhibit a phenomenon in which the viscosity of the sealant composition becomes excessively high and a uniform applied film thickness cannot be obtained. Moreover, when the solid content concentration of the sealant in the organic solvent is at least the lower limit of the range set forth above, it is possible to inhibit a phenomenon in which an excessively thin applied film is obtained.

The organic solvent that is used in the sealant composition is an organic solvent in which the polymer components of the sealant dissolve at normal temperature or under heating and is not limited to a specific organic solvent. Specific examples of organic solvents that may be used include aromatic hydrocarbon compounds such as benzene, toluene, and xylene; saturated aliphatic and alicyclic hydrocarbon compounds such as n-hexane, cyclohexane, methylcyclohexane, ethylcyclohexane, nonane, decane, decalin, tetralin, and dodecane; and hydrocarbon mixtures such as gasoline and industrial gasoline.

No specific limitations are placed on the method by which the sealant composition is produced. For example, the sealant composition may be produced by the following procedure. First, the polymer components are dissolved in the organic solvent and then undissolved matter is removed using a filter or the like as necessary. Specific examples of filters that may be used include filters obtained through weaving of filiform fiber, metal, or the like into a reticulated form and filters obtained through perforation of fine holes in a planar material. Next, an inorganic filler (D) may be dispersed and various compounding agents may be dissolved or dispersed in the resultant solution as necessary. Moreover, defoaming may be carried out to remove bubbles contained in the solution as necessary. Examples of defoaming methods that may be adopted include vacuum defoaming and ultrasonic defoaming.

(Electrochemical Device in which Non-Aqueous Electrolysis Solution is Used)

The presently disclosed sealant and sealant composition can be used in an electrochemical device in which a non-aqueous electrolysis solution is used. Examples of such electrochemical devices include secondary batteries such as lithium ion batteries and electrical and electronic components such as electric field capacitors, electric double-layer capacitors, and lithium ion capacitors.

Specifically, the electrochemical device in which the presently disclosed sealant or sealant composition is used may, for example, be an electrochemical device including: a container having an opening and housing an electrical power generating element; and an insulating gasket installed at the opening of the container through a sealant or an insulating gasket attached through a sealant to a sealing body that is installed at the opening of the container, wherein the sealant is the presently disclosed sealant or a sealant layer formed using the presently disclosed sealant composition.

From a viewpoint of obtaining high sealing performance, it is preferable that the insulating gasket that is attached using the sealant is formed from a thermoplastic polyester elastomer (TPC).

For example, in a case in which the presently disclosed sealant and sealant composition are used in a lithium ion battery, the sealant set forth above or a layer of sealant formed by the sealant composition set forth above (sealant layer) may be provided between a metal container that houses an electrical power generating element and an insulating gasket that is installed at an opening of the metal container and/or between an insulating gasket and a sealing body. The material of the metal container, the electrical power generating element, and the insulating gasket that are used in the lithium ion battery may be the same as typically used. Moreover, the lithium ion battery is tightly sealed with the electrical power generating element housed in the metal container.

The electrical power generating element is an electrolyte, active materials for a positive electrode and a negative electrode, a separator, and so forth. A non-aqueous electrolysis solution is used for the electrolyte. Moreover, the non-aqueous electrolysis solution contains a supporting electrolyte and a non-aqueous electrolysis solution solvent.

The supporting electrolyte contained in the non-aqueous electrolysis solution is, for example, a compound that readily reacts with water to undergo hydrolysis such as a lithium compound (for example, $LiPF_6$, $LiBF_4$, or $LiClO_4$). The non-aqueous electrolysis solution solvent is, for example, a flammable organic compound such as propylene carbonate (PC), ethylene carbonate (EC), or diethyl carbonate (DEC). It is preferable that a TPC is used as the insulating gasket.

<Formation of Sealant Layer>

The sealant layer can be formed, for example, by the following procedure. First, a specific amount of the sealant composition is supplied to and applied onto the surface of the metal container and/or the surface of the insulating gasket by a metering pump such as an air-driven metering dispenser, a roller pump, or a gear pump. After this application, the sealant composition is naturally dried while maintaining a horizontal state to prevent non-uniform coating of the sealant composition, and thus the organic solvent is removed to form a thin layer. In this disclosure, it is preferable that the insulating gasket is formed from a high-polarity resin such as a TPC.

Note that the application is not limited to a method in which a metering pump is used and may be carried out by hand using a brush if the amount is small. Moreover, the drying may alternatively be forced drying using a heating device instead of natural drying. This enables drying in a shorter time and thus provides a process that is more industrially appropriate.

In a case in which a heating device is used, drying is normally performed at approximately 30° C. to 150° C. for approximately 5 minutes to 180 minutes to remove the organic solvent. The residual concentration of the organic solvent in the sealant layer is preferably adjusted to 5 mass % or less, more preferably 2 mass % or less, even more preferably 1 mass % or less, and particularly preferably 0.5 mass % or less through removal of the organic solvent by drying. If the drying temperature of the organic solvent exceeds or is around the boiling point of the organic solvent, surface unevenness may arise as a result of foaming occurring. Therefore, it is preferable that the drying temperature is set in accordance with properties of the organic solvent. The drying temperature is, as a rough guide, preferably set as at least 5° C. lower than the boiling point of the organic solvent, and more preferably at least 10° C. lower than the boiling point of the organic solvent, and the sealant composition is normally dried within a range of 30° C. to 150° C. while also taking into account the boiling point of the organic solvent.

The thickness of the sealant layer formed by the method described above may be freely selected depending on the size of the metal container and the insulating gasket, and is normally at least 0.1 μm and not more than 1,000 μm. When the thickness of the sealant layer is not more than the upper limit of the range set forth above, it is possible to inhibit a phenomenon in which formation of the sealant layer becomes difficult. Moreover, when the thickness of the sealant layer is at least the lower limit of the range set forth above, it is possible to inhibit a phenomenon in which problems such as leakage of electrolysis solution and infiltration of moisture occur, and the sealant layer is severed.

EXAMPLES

The following describes the present disclosure through examples. However, the present disclosure is not limited to these examples. Note that "parts" and "%" in the present examples are by mass unless otherwise specified. Wettability, peel strength, flexibility (bending tolerance), heat resistance, and electrolysis solution resistance were judged as follows in the examples and comparative examples.

(Wettability)

A sealant composition obtained in each example or comparative example was cast onto a TPC plate of 2 mm in thickness (plate obtained through injection molding of Hytrel 5557 produced by Du Pont-Toray Co., Ltd.) using a doctor blade having a gap of 250 μm and was dried by heating at 80° C. for 20 minutes to form a film on the TPC plate. The formed film was visually inspected and was given an evaluation of "good" in a case in which the entire film was colored black and an evaluation of "poor" in a case in which the film was partially transparent. The evaluation results are shown in Table 1. In a case in which the entire film is colored black, this indicates that the film has apparent uniformity and that wettability of the sealant composition with respect to the TPC plate is excellent.

(Peel Strength)

The sealant composition obtained in each example or comparative example was cast onto a TPC plate, a polypropylene (PP) plate, and aluminum foil of 2 mm in thickness using a doctor blade having a gap of 250 μm and was dried by heating at 80° C. for 20 minutes to form a film on each of the TPC plate, the PP plate, and the aluminum foil, and thereby obtain specimens. Next, the peel strength of each of these specimens was measured by a 90° peeling method. Specifically, each of the specimens was cut to a ribbon shape of 18 mm in width, aluminum tape with an adhesive was attached thereto, and peel strength was measured using a tensile tester. The measurement results are shown in Table 1.

(Flexibility)

The sealant composition obtained in each example or comparative example was cast onto aluminum foil of 11 μm in thickness using a doctor blade having a gap of 250 μm and was dried by heating at 80° C. for 20 minutes to form a film on the aluminum foil and thereby obtain a specimen. Next, the specimen was bent at −30° C. with the surface at which the film was formed at the outside. The bent section of the specimen was visually inspected. An evaluation of "good" was given in a case in which cracking, peeling, or the like was not observed at the bent section, and an evaluation of "poor" was given in a case in which cracking, peeling, or the like was observed. The evaluation results are shown in Table 1.

(Heat Resistance)

The sealant composition obtained in each example or comparative example was cast onto aluminum foil of 2 mm in thickness using a doctor blade having a gap of 250 μm and was dried by heating at 80° C. for 20 minutes to form a film on the aluminum foil and thereby obtain a specimen. Next, the aluminum foil side of the specimen was fixed vertically by metal wire and heating was performed for 1 hour in a 150° C. oven. The external appearance of the film after heating was visually inspected. An evaluation of "good" was given in a case in which deformation of the film was not observed and an evaluation of "poor" was given in a case in which deformation was observed. The evaluation results are shown in Table 1.

(Electrolysis solution resistance) The sealant composition obtained in each example or comparative example was cast onto aluminum foil of 2 mm in thickness using a doctor blade having a gap of 250 μm and was dried by heating at 80° C. for 20 minutes to form a film on the aluminum foil and thereby obtain a specimen. The specimen was immersed in a non-aqueous electrolysis solution (80° C., 100 hours) and was then weighed after removing droplets of liquid attached to the surface of the film when the specimen was taken out of the non-aqueous electrolysis solution. The percentage increase from the dry weight is shown in Table 1 as the degree of swelling. A smaller value for the degree of swelling indicates better electrolysis solution resistance. The non-aqueous electrolysis solution was a solution in which $LiPF_6$ was dissolved in a non-aqueous electrolysis solution solvent (EC/DEC=1/2 (volume ratio)) as a supporting electrolyte with a concentration of 1 mol/L.

Polymerization Example 1

A 10 L autoclave equipped with a stirrer was charged with 5,000 g of toluene and 810 g of butadiene and these materials were sufficiently stirred. Thereafter, 0.27 mol of diethylaluminum chloride and 0.6 mmol of chromium chloride-pyridine complex were added and polymerization was carried out for 3 hours under stirring at 60° C. Polymerization was subsequently terminated through addition of 100 mL of methanol. After termination of polymerization, the polymerization liquid was cooled to room temperature and then removed from the autoclave. The obtained polymerization liquid was subjected to steam coagulation and then vacuum drying at 60° C. for 48 hours to yield 780 g of a solid polymer (1). Mw of the obtained polymer (1) was 390,000.

Polymerization Example 2

A 10 L autoclave equipped with a stirrer was charged with 5,000 g of toluene and 810 g of butadiene and these materials were sufficiently stirred. Thereafter, 0.20 mol of diethylaluminum chloride and 0.6 mmol of chromium chloride-pyridine complex were added and polymerization was carried out for 3 hours under stirring at 60° C. Polymerization was subsequently terminated through addition of 100 mL of methanol. After termination of polymerization, the polymerization liquid was cooled to room temperature and then removed from the autoclave. The obtained polymerization liquid was subjected to steam coagulation and then vacuum drying at 60° C. for 48 hours to yield 760 g of a solid polymer (2). Mw of the obtained polymer (2) was 520,000.

Example 1

A homogeneous solution (sealant composition) having a solid content concentration of 5% was obtained by mixing 55 parts of the polymer (1) obtained in Polymerization Example 1 as a conjugated diene polymer (A), 15 parts of SIS having a styrene content of 15% and Mw of 32,000 as an aromatic vinyl-conjugated diene block polymer (B), 30 parts of an amine-modified styrene-ethylene-butylene-styrene block copolymer (Tuftec MP10 produced by Asahi Kasei Chemicals Corporation) as a hydrogenated amine-modified aromatic vinyl-conjugated diene block polymer (C), 5 parts of carbon black (furnace black having a primary particle diameter of 10 nm) as an inorganic filler (D), and an organic solvent (xylene) under heating at 50° C. in a flask equipped with an impeller.

Example 2

A homogeneous solution (sealant composition) having a solid content concentration of 10% was obtained by mixing 65 parts of the polymer (1) obtained in Polymerization Example 1 as a conjugated diene polymer (A), 13 parts of the same SIS as in Example 1 as an aromatic vinyl-conjugated diene block polymer (B), 22 parts of an amine-modified styrene-ethylene-butylene-styrene block copolymer (Tuftec MP10 produced by Asahi Kasei Chemicals Corporation) as a hydrogenated amine-modified aromatic vinyl-conjugated diene block polymer (C), 5 parts of the same carbon black as in Example 1 as an inorganic filler (D), and an organic solvent (xylene) under heating at 50° C. in a flask equipped with an impeller.

Example 3

A homogeneous solution (sealant composition) having a solid content concentration of 12% was obtained by mixing 60 parts of the polymer (2) obtained in Polymerization Example 2 as a conjugated diene polymer (A), 10 parts of the same SIS as in Example 1 as an aromatic vinyl-conjugated diene block polymer (B), 30 parts of an amine-modified styrene-ethylene-butylene-styrene block copolymer (Tuftec MP10 produced by Asahi Kasei Chemicals Corporation) as a hydrogenated amine-modified aromatic vinyl-conjugated diene block polymer (C), 5 parts of the same carbon black as in Example 1 as an inorganic filler (D), and an organic solvent (xylene) under heating at 50° C. in a flask equipped with an impeller.

Example 4

A homogeneous solution (sealant composition) having a solid content concentration of 12% was obtained by mixing 40 parts of the polymer (1) obtained in Polymerization Example 1 and 30 parts of the polymer (2) obtained in Polymerization Example 2 as conjugated diene polymers (A), 15 parts of the same SIS as in Example 1 as an aromatic vinyl-conjugated diene block polymer (B), 15 parts of an amine-modified styrene-ethylene-butylene-styrene block copolymer (Tuftec MP10 produced by Asahi Kasei Chemicals Corporation) as a hydrogenated amine-modified aromatic vinyl-conjugated diene block polymer (C), 5 parts of the same carbon black as in Example 1 as an inorganic filler (D), and an organic solvent (xylene) under heating at 50° C. in a flask equipped with an impeller.

Comparative Example 1

A homogeneous solution (sealant composition) having a solid content concentration of 13% was obtained by mixing 55 parts of the same 1,3-butadiene polymer as in Example 1 (polymer (1)) as a conjugated diene polymer (A), 15 parts of the same SIS as in Example 1 as an aromatic vinyl-conjugated diene block polymer (B), 30 parts of a hydrogenated acid-modified aromatic vinyl-conjugated diene block polymer (Tuftec MP1911 produced by Asahi Kasei Chemicals Corporation) instead of a hydrogenated amine-modified aromatic vinyl-conjugated diene block polymer (C), 5 parts of the same carbon black as in Example 1 as an inorganic filler (D), and an organic solvent (xylene) under heating at 50° C. in a flask equipped with an impeller.

Comparative Example 2

A homogeneous solution (sealant composition) having a solid content concentration of 10% was obtained by mixing 90 parts of the same 1,3-butadiene polymer as in Example 1 (polymer (1)) as a conjugated diene polymer (A), 10 parts of a hydrogenated aromatic vinyl-conjugated diene block polymer (Tuftec H1041 produced by Asahi Kasei Chemicals Corporation) instead of an aromatic vinyl-conjugated diene block polymer (B), 5 parts of the same carbon black as in Example 1 as an inorganic filler (D), and an organic solvent (xylene) under heating at 50° C. in a flask equipped with an impeller. Note that a hydrogenated amine-modified aromatic vinyl-conjugated diene block polymer (C) was not used.

Comparative Example 3

A homogeneous solution (sealant composition) having a solid content concentration of 15% was obtained by mixing 20 parts of the same 1,3-butadiene polymer as in Example 1 (polymer (1)) as a conjugated diene polymer (A), 15 parts of the same SIS as in Example 1 as an aromatic vinyl-conjugated diene block polymer (B), 65 parts of a hydrogenated acid-modified aromatic vinyl-conjugated diene block polymer (Tuftec MP1911 produced by Asahi Kasei Chemicals Corporation) instead of a hydrogenated amine-modified aromatic vinyl-conjugated diene block polymer (C), 5 parts of the same carbon black as in Example 1 as an inorganic filler (D), and an organic solvent (xylene) under heating at 50° C. in a flask equipped with an impeller.

Comparative Example 4

A homogeneous solution (sealant composition) having a solid content concentration of 15% was obtained by mixing 50 parts of the polymer (2) obtained in Polymerization Example 2 as a conjugated diene polymer (A), 50 parts of a hydrogenated aromatic vinyl-conjugated diene block polymer (Tuftec H1041 produced by Asahi Kasei Chemicals Corporation) instead of an aromatic vinyl-conjugated diene block polymer (B), 5 parts of the same carbon black as in Example 1 as an inorganic filler (D), and an organic solvent (xylene) under heating at 50° C. in a flask equipped with an impeller. Note that a hydrogenated amine-modified aromatic vinyl-conjugated diene block polymer (C) was not used.

TABLE 1

| | Type | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Conjugated diene polymer (A) | Polymer (1) (Mw = 390,000) (parts) | 55 | 65 | — | 40 | 55 | 90 | 20 | — |
| | Polymer (2) (Mw = 520,000) (parts) | — | — | 60 | 30 | — | — | — | 50 |
| Aromatic vinyl-conjugated diene block polymer (B) | SIS (parts) | 15 | 13 | 10 | 15 | 15 | — | 15 | — |
| Hydrogenated aromatic vinyl-conjugated diene block polymer | Tuftec H1041 (parts) | — | — | — | — | — | 10 | — | 50 |
| Hydrogenated amine-modified aromatic vinyl-conjugated diene block polymer (C) | Tuftec MP10 (parts) | 30 | 22 | 30 | 15 | — | — | — | — |

TABLE 1-continued

| | Type | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Hydrogenated acid-modified aromatic vinyl-conjugated diene block polymer | Tuftec M1911 (parts) | — | — | — | — | 30 | — | 65 | — |
| Inorganic filler (D) | Carbon black (parts) | 5 | 5 | 5 | 5 | 5 | 5 | 5 | 5 |
| Solid content concentration (%) | | 5 | 10 | 12 | 12 | 13 | 10 | 15 | 15 |
| Evaluations | Wettability | Good | Good | Good | Good | Poor (non-uniform) | Good | Poor (non-uniform) | Good |
| Peel strength (N/18 mm) | TPC plate | 4.2 | 4.6 | 4.1 | 4.1 | 1.2 | 2.5 | 1.2 | 1.2 |
| | PP plate | 4.4 | 4.6 | 4.1 | 3.8 | 4.4 | 3.8 | 2.1 | 2.7 |
| | Aluminum foil | 3.8 | 3.6 | 3.7 | 4.9 | 5.5 | 1.9 | 7.8 | 3.2 |
| | Flexibility (bending tolerance) | Good | Good | Good | Good | Good | Good | Poor | Good |
| | Heat resistance | Good | Good | Good | Good | Poor | Poor | Good | Good |
| | Electrolysis solution resistance | 1%> | 1%> | 1%> | 1%> | 2% | 1%> | 2% | 1%> |

As can be seen from Table 1, sealant compositions in which a sealant was used that contained a conjugated diene polymer (A), an aromatic vinyl-conjugated diene block polymer (B), and a hydrogenated amine-modified aromatic vinyl-conjugated diene block polymer (C) had excellent wettability, and sealant layers obtained from these sealant compositions had good peel strength, flexibility, heat resistance, and electrolysis solution resistance.

The invention claimed is:

1. A sealant for an electrochemical device in which a non-aqueous electrolysis solution is used, comprising:
    a conjugated diene polymer (A);
    an aromatic vinyl-conjugated diene block polymer (B); and
    a hydrogenated amine-modified aromatic vinyl-conjugated diene block polymer (C).

2. The sealant for an electrochemical device in which a non-aqueous electrolysis solution is used according to claim 1, wherein
    at least 37 mass % and not more than 80 mass % of the conjugated diene polymer (A), at least 3 mass % and not more than 30 mass % of the aromatic vinyl-conjugated diene block polymer (B), and at least 10 mass % and not more than 60 mass % of the hydrogenated amine-modified aromatic vinyl-conjugated diene block polymer (C) are contained relative to a total amount of the conjugated diene polymer (A), the aromatic vinyl-conjugated diene block polymer (B), and the hydrogenated amine-modified aromatic vinyl-conjugated diene block polymer (C).

3. The sealant for an electrochemical device in which a non-aqueous electrolysis solution is used according to claim 1, further comprising
    at least 0.1 parts by mass and not more than 10 parts by mass of an inorganic filler (D) per 100 parts by mass of solid content of polymer components including the conjugated diene polymer (A), the aromatic vinyl-conjugated diene block polymer (B), and the hydrogenated amine-modified aromatic vinyl-conjugated diene block polymer (C).

4. A sealant composition for an electrochemical device comprising the sealant for an electrochemical device in which a non-aqueous electrolysis solution is used according to claim 1 dissolved in an organic solvent such as to have a solid content concentration of at least 1 mass % and not more than 20 mass %.

5. An electrochemical device comprising:
    a container having an opening and housing an electrical power generating element; and
    an insulating gasket installed at the opening of the container through a sealant or an insulating gasket attached through a sealant to a sealing body that is installed at the opening of the container, wherein
    the sealant is the sealant for an electrochemical device in which a non-aqueous electrolysis solution is used according to claim 1.

6. The electrochemical device according to claim 5, wherein
    the insulating gasket is formed from a thermoplastic polyester elastomer.

* * * * *